United States Patent [19]

Burgess

[11] 4,325,160

[45] Apr. 20, 1982

[54] WINDSHIELD WIPER BLADE ASSEMBLY

[75] Inventor: Robert K. Burgess, Easton, Conn.

[73] Assignee: Auto Parts Mfg. Inc., Branford, Conn.

[21] Appl. No.: 169,512

[22] Filed: Jul. 21, 1980

[51] Int. Cl.³ .............................................. B60S 1/38
[52] U.S. Cl. ................................................ 15/250.06
[58] Field of Search ............ 15/250.05, 250.06, 250.36; 174/120 SR; 264/174, 130, 213

[56] References Cited

U.S. PATENT DOCUMENTS

| | | | |
|---|---|---|---|
| 2,902,754 | 9/1959 | Lorenian | 264/171 X |
| 2,966,692 | 1/1961 | Zaiger | 15/250.36 |
| 3,121,133 | 2/1964 | Mathues | 15/250.36 X |
| 3,372,421 | 3/1968 | Meltzer | 15/250.06 |
| 3,409,930 | 11/1968 | Linker | 15/250.06 |
| 3,587,129 | 6/1971 | Linker | 15/250.06 |
| 3,639,938 | 2/1972 | Golden | 15/250.06 |
| 3,718,940 | 3/1973 | Bode | 15/250.06 |
| 4,000,362 | 12/1976 | Kawaguchi et al. | 174/120 SR |

Primary Examiner—Peter Feldman

Attorney, Agent, or Firm—Prutzman, Kalb, Chilton & Alix

[57] ABSTRACT

A windshield wiper is provided which comprises a slotted metal backing or mounting strip and an extruded blade of rubber or rubber-like material formed with a main body mounting portion and a generally triangular wiping portion, the body portion having a first pair of complimentary longitudinal side grooves for engagement by the backing or mounting strip and a similar second pair of grooves parallel to the first pair forming a thin section adjoining the generally triangular wiping portion of the blade, and a longitudinally extending heater wire adapted to be energized electrically embedded in the wider section of the generally triangular wiping section in proximity to the neutral or elastic axis of the blade whereby torsional restraint is minimized. A parting agent or lubricant may be used between the wire and rubber material to minimize frictional engagement therebetween and, if desired, two of the blades may be used in tandem by mounting them in a backing or mounting strip having a pair of elongated slots for mounting the blades in parallel, side-by-side relationship.

4 Claims, 4 Drawing Figures

WINDSHIELD WIPER BLADE ASSEMBLY

The present invention relates to wipers for windshield or windscreens of motor vehicles and the like and is concerned, more particularly, with windshield wipers having electrically energized heating means associated therewith.

As is well known, windshield wipers generally comprise an elongated blade of rubber or rubber-like material attached to a backing or mounting strip. When the wiper is to be used, it is secured by clamping means engaging the backing or mounting strip to one end of an actuating arm which is supported at its other end on the frame of the windshield and attached to oscillating driving means. When the windshield wiper is in operation, it is driven back and forth with the blade in contact with the surface of the windshield, and the function of the blade is to wipe off the moisture in its path as it travels across the surface of the windshield. Such conventional wipers are usually effective in operation and produce reasonably acceptable results in warm weather, but under ambient freezing conditions and/or during precipitation of snow or sleet, difficulties are encountered in that the blade tends to become stiff, and snow or ice will tend to accumulate and build up on the blade, all of which interfere with the wiping action of the blade. It is a common practice to utilize various heating means or devices for applying heat to the inside of the windshield to melt or at least soften any ice or snow tending to accumulate on the windshield, but the amount of heat transferred to the blade by such means is negligible and does not solve the problem of stiffness of the blade nor the prevention or removal of snow or ice accumulation on the blade under adverse weather conditions.

In an attempt to overcome these difficulties, various arrangements have been tried for applying heat more directly to the blade, but these attempts have generally been ineffective. For example, when heating means is applied to the backing or holder strip to which the blade is attached, it is found that the heat transfer to the blade is generally inadequate to accomplish the desired result. Similarly, previous attempts to improve the heat transfer by attaching heating means directly to the blade have also been ineffective because of the adverse effect on the operation of the blade. As will be appreciated, the windshields of modern cars are not flat, but are curved transversely as well as vertically and the amount of curvature varies. Therefore, it becomes necessary to utilize a blade which is extremely flexible and can bend as well as twist so as to conform to the surface of the windshield and its varying contours as required for effective wiping action. Because of this requirement, a major disadvantage of the various heating means or arrangements which have been proposed heretofore has been that the flexibility of the blade has been decreased to such an extent that the wiping action of the blade is seriously interfered with and the blade operates erratically and tends to chatter and the blade usually has a reduced service life.

Accordingly, it is an object of the present invention to provide a windshield wiper blade with electrical heating means which under most operating conditions will be able to furnish sufficient heat to the blade to retain the flexibility of the blade and to prevent or remove the accumulation of snow or ice on the blade without at the same time interferring with the normal operation of the blade.

Another object is to provide such an improved electrically heated windshield wiper blade which is economical to fabricate and assemble from readily available materials and effective for obtaining consistently good performance results and which will have a long service life so that the need for frequent replacement is avoided.

Other objectives will be in part obvious and in part pointed out in more detail hereinafter.

A better understanding of the invention will be obtained from the following description and the accompanying drawings of illustrative applications of the invention.

Figure 1:
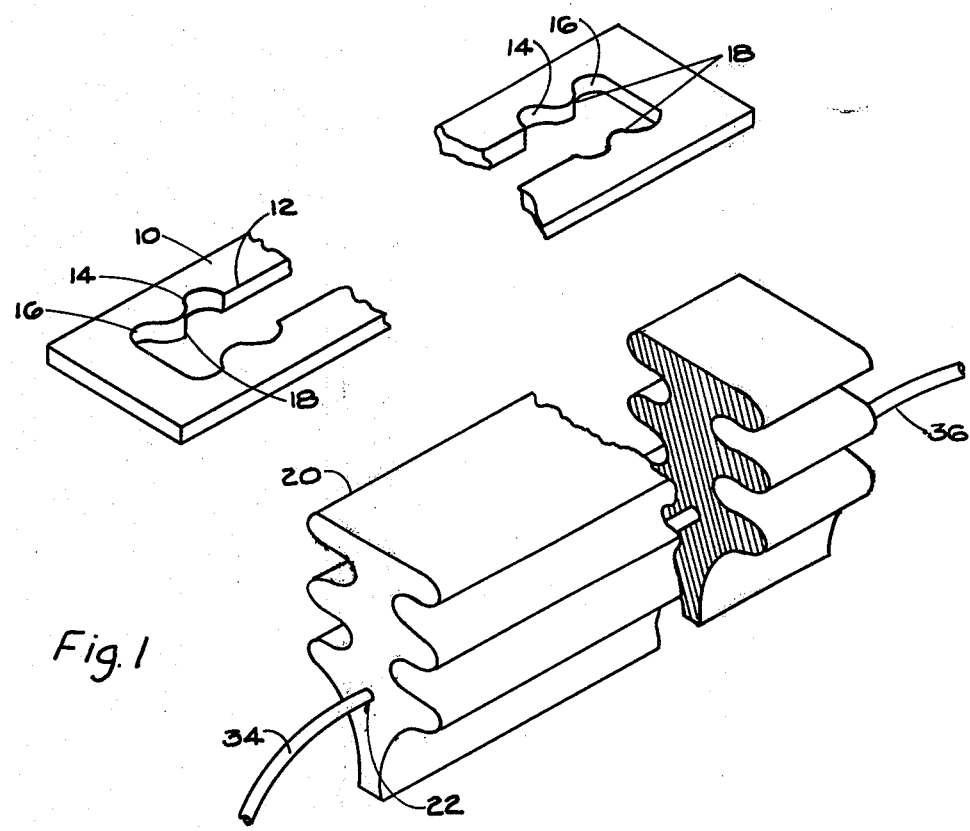
FIG. 1 is an exploded fragmentary view in perspective of one embodiment of the wiper blade assembly of my invention.
Figure 2:
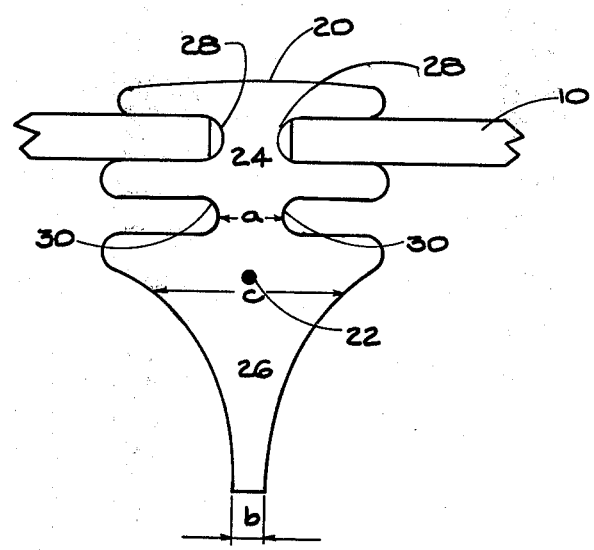
FIG. 2 is an enlarged transverse cross-sectional view of the wiper blade assembly of FIG. 1.
Figure 3:
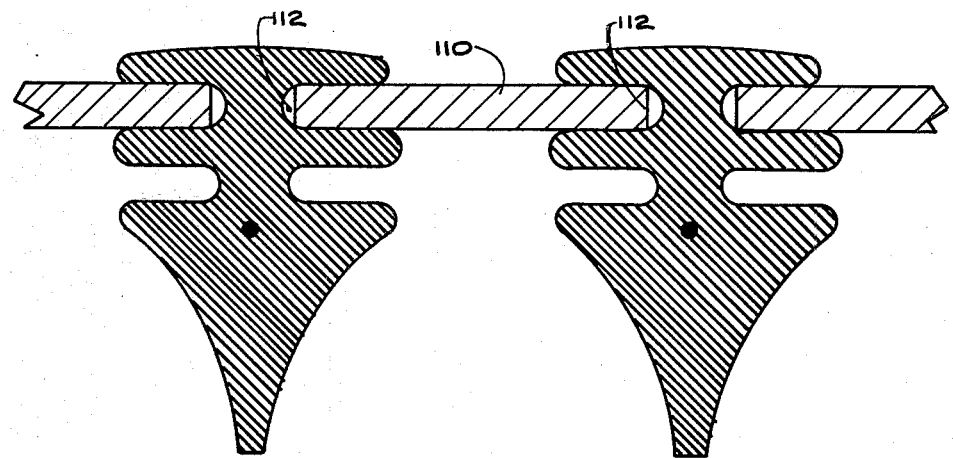
FIG. 3 is a transverse cross-sectional view of another embodiment of the wiper blade assembly of my invention.

Referring to the drawings in detail, the preferred embodiment of a windshield wiper blade made in accordance with the invention as shown in FIGS. 1, 2 and 3, comprises a backing or mounting strip 10 and a blade 20 which are assembled together as shown in FIG. 2. The backing or mounting strip 10 is a flexible elongated narrow and thin metal strip preferably formed of a corrosion-resistant metal such as stainless steel. The strip 10 has a central longitudinally extending narrow slot 12 which terminates at opposite ends in enlarged openings 14 and 16 separated by inwardly extending projections 18.

The blade 20 is an extrusion of rubber or rubber-like elastomeric material. In general, I have found the preferred material to use is a high grade ozone resistant natural rubber. Embedded in the blade 20 as it is extruded is a longitudinally extending electrical resistance wire 22 such as Nichrome wire which is preferably in the form of a thin single strand having a round cross-section. During extrusion, the wire 22 is guided so that it is located as best shown in FIG. 2 within the wide portion of the blade 20 discussed more fully hereinafter. Also as discussed more fully hereinafter, the outer configuration or profile of the extruded blade 20 and the location and manner of embedding the wire 22 are such that it is assured that there will be adequate heat transfer to the blade when the wire is electrically energized so as to prevent ice and sleet accumulation and to preserve the elasticity of the blade and at the same time there is provided maximum wiping ability and minimum longitudinal bending stiffness and torsional reinforcement of the blade for maximum conformance to the windshield shape.

Referring to FIG. 2 of the drawings, it will be seen that, in cross-section, the blade 20 has a main body mounting portion 24 and a tapered generally triangular wiping portion 26. The main body portion 24 is characterized by complimentary longitudinally extending side grooves 28 and 30. The upper grooves 28 form a seat for receiving the inner edges of the backing or mounting strip 10 whereby the two parts are interconnected to form the windshield wiper assembly as shown in FIG.

Figure 4:
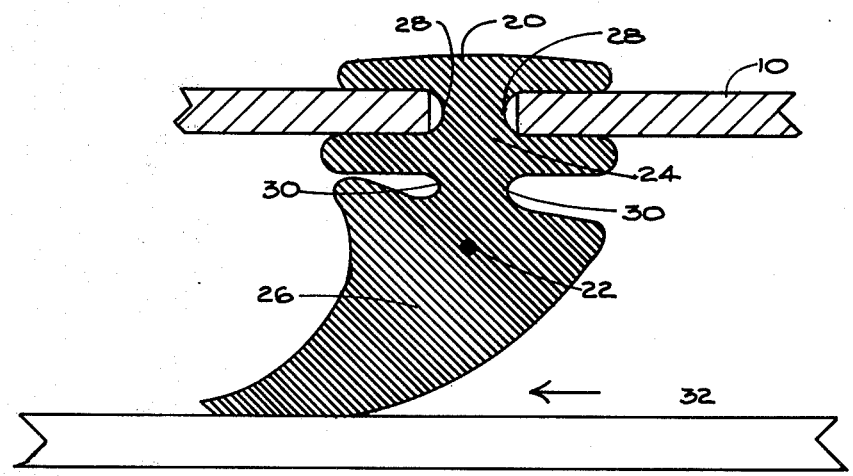
FIG. 4 is a transverse cross-sectional view of the wiper blade assembly of FIG. 1 showing the deformation of the blade when in working contact with the windshield.

2. The two lower grooves 30 are provided to form a thin cross-section above the triangular wiping portion 26 as indicated at "a" which is approximately the same as the thin section "b" at the apex or free edge of wiping portion 26, both cross-sections being considerably smaller than the cross-section "c" near the broad portion of the generally triangular portion 26. As a specific example, the dimensions "a" and "b" may be as small as 1 mm or less while the dimension of "c" may be of the order of 5 mm. As a result of this construction, as best illustrated in FIG. 4 of the drawings, the maximum area of the wiper blade 20 will come into contact with the surface of the windshield when the windshield wiper is in operation. As will be appreciated, the blade 20 is pressed rectilinearly toward the windshield 32 by the force of the wiper arm (not shown) to which it is attached and is also subjected to a frictional force as represented by the arrow in FIG. 4 when the blade is moved from left to right as viewed in FIG. 4. This causes the blade 20 to lay over and present a wiping surface rather than a wiping edge to the windshield. The blade will lay over in the opposite direction, of course, when the blade is moved in the opposite direction. This lay over characteristic produces a blade having a better wiping action compared to a squeegee which is relatively stiff and relies on the straightness of its edge to achieve the wiping function. Also, a blade which lays over is more stable in operation as evidenced, for example, by the absence of chatter. A lay over of as much as one-third measured from the apex of the triangular wiping portion 24 is desirable in most installations.

A significant feature of the invention as illustrated in FIG. 4 of the drawing is that the curvature of the blade takes place primarily at the thin section "a" and in the tapered portion adjacent the thin section "b" with the result that the curvature of section "c" is reduced to a minimum. In accordance with the invention, the heater wire is located in the wide portion of the blade at section "c" which is close to its neutral or elastic axis of the blade thus producing a minimum torsional restraint at the heating wire-rubber interface. In addition, because the heater wire is located near or in proximity to the neutral or elastic axis of the blade, the effect of the wire on longitudinal bending stiffness is minimal thus assuring maximum conformance of the blade to the windshield shape. A further advantage of the windshield wiper construction of my invention is that there is no chemical or adhesive bond between the heater wire 22 and the rubber or rubber-like material of the blade 20 and, in the preferred embodiment, a lubricant or a parting agent such as the silicone compound sold commercially under the trademark "Dow-Corning" is employed to further minimize frictional or mechanical engagement therebetween and thus further reduce any torsional restraint produced by the wire 22.

The blade with the heater wire embedded therein may be formed conveniently and economically by using conventional extrusion equipment similar to that employed in the covering of wire and cable. In such equipment the rubber in molten condition is forced through a die orifice having the desired profile of the blade while the heater wire from a supply spool is also fed through the die and guided so as to be embedded in the desired location as previously described. While more than one heater wire may be employed, a single strand of wire having a round cross-section is preferred in order to minimize torsional resistance. Preferably a pressure type die is used to ensure a tight contact between the heater wire and the rubber or rubber-like material thus assuring maximum heat transfer from the wire to the body of the blade. If used, the parting agent may be applied to the blade as it is fed to the die and, if desired, the wire may be preheated to eliminate grease and improve the extrusion operation. In order to form the finished blade after extrusion, the extrudate is cut to desired lengths and insulated wire connectors 34, 36 are soldered or otherwise connected to the opposite ends of the heater wire 22 which wire connectors are used to connect the heater wire 22 to a source of electric energy such as a car battery.

A modification of the invention is shown in FIG. 3 of the drawings which is particularly suitable for use in larger installations such as on trucks, locomotives, aircraft and industrial vehicles. In this modification, the backing or mounting strip 110 is made approximately twice as wide as the strip 10 of the first embodiment and has two side-by-side slots 112 for receiving and holding two of the blades 20 in tandem.

In either the single blade embodiment as shown in FIGS. 1, 2 and 4 or the multiple blade embodiment shown in FIG. 3, there is sufficient heat transferred to the body of the blade 20 by the heater wire 22 to maintain the blade in pliable condition and to prevent snow or sleet accumulation under extreme adverse weather conditions while at the same time the excellent wiping characteristics of the blade are not appreciably diminished by the presence of the heater wire therein.

Modification, adaptations, and variations of the foregoing specific disclosure will be apparent to and can be made by one skilled in the art without departing from the teachings of the present invention.

I claim:

1. In a windshield wiper comprising an extruded blade of rubber or rubber-like material formed with a main body mounting portion, a generally triangular wiping portion, and a pair of complimentary longitudinally extending side grooves forming a thin section interconnecting the main body mounting portion and the generally triangular wiping portion, the improvement comprising a longitudinally extending heater wire having a round cross-section embedded in but nonadhering to the rubber or rubber-like material of the blade, said wire being positioned in the wider section of the generally triangular wiping portion in proximity to the neutral or elastic axis of the blade whereby when the blade is under stress during a windshield wiping operation the wire will cause minimum torsional resistance and bending stiffness in the blade.

2. A windshield wiper as defined in claim 1 wherein the heater wire is a single strand of Nichrome wire.

3. A windshield wiper as defined in claim 1 or 2 wherein there is a lubricant or parting agent at the interface of the heater wire and the rubber or rubber-like material of the blade.

4. A windshield wiper as defined in claim 3 wherein the wire is coated with a silicone compound.

* * * * *